March 12, 1940.  I. J. AYO  2,193,157
AGRICULTURAL IMPLEMENT
Filed April 25, 1939    3 Sheets-Sheet 2
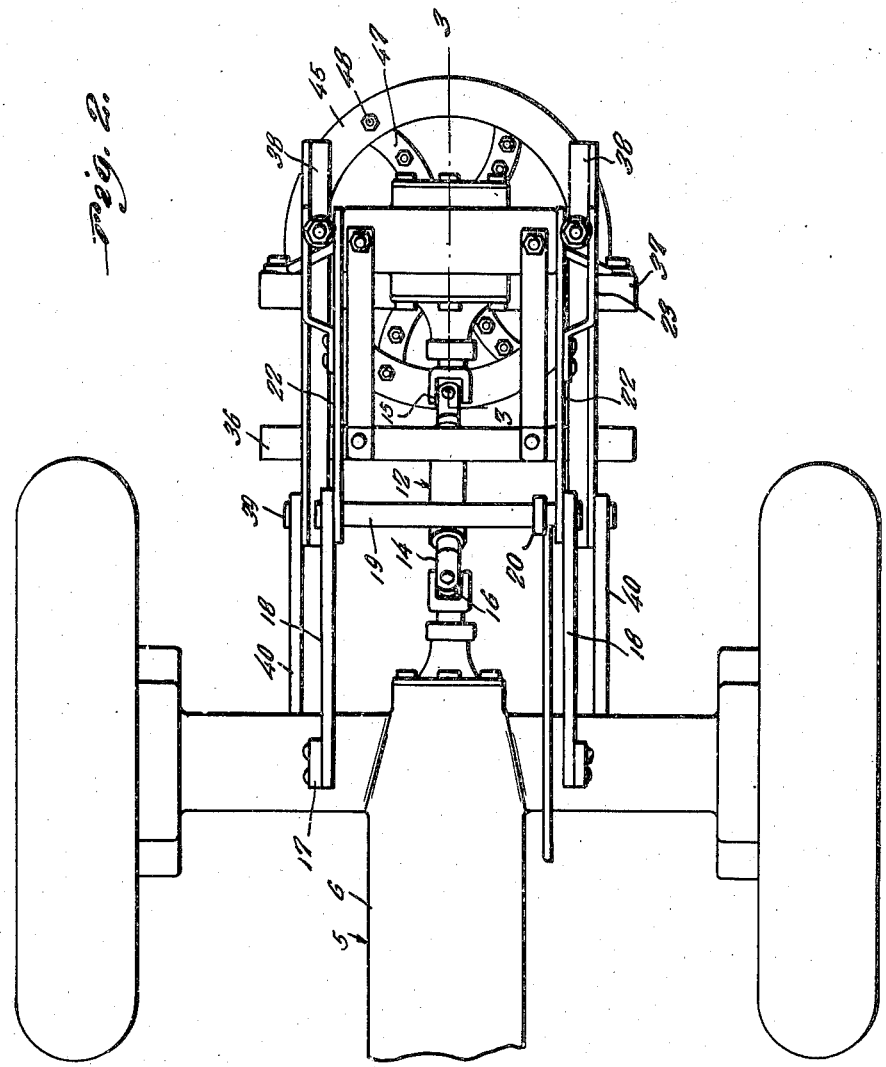
Inventor
I. J. Ayo
By Clarence A. O'Brien
and Hyman Berman
Attorneys

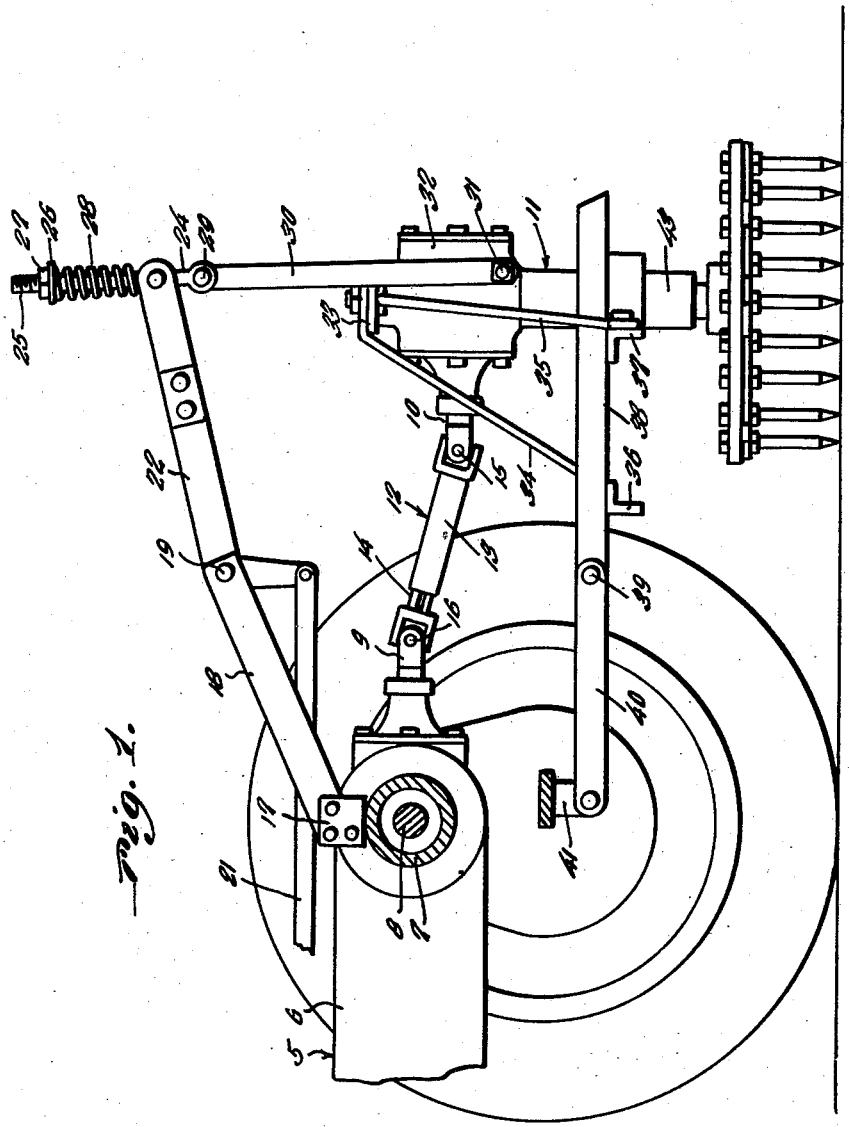

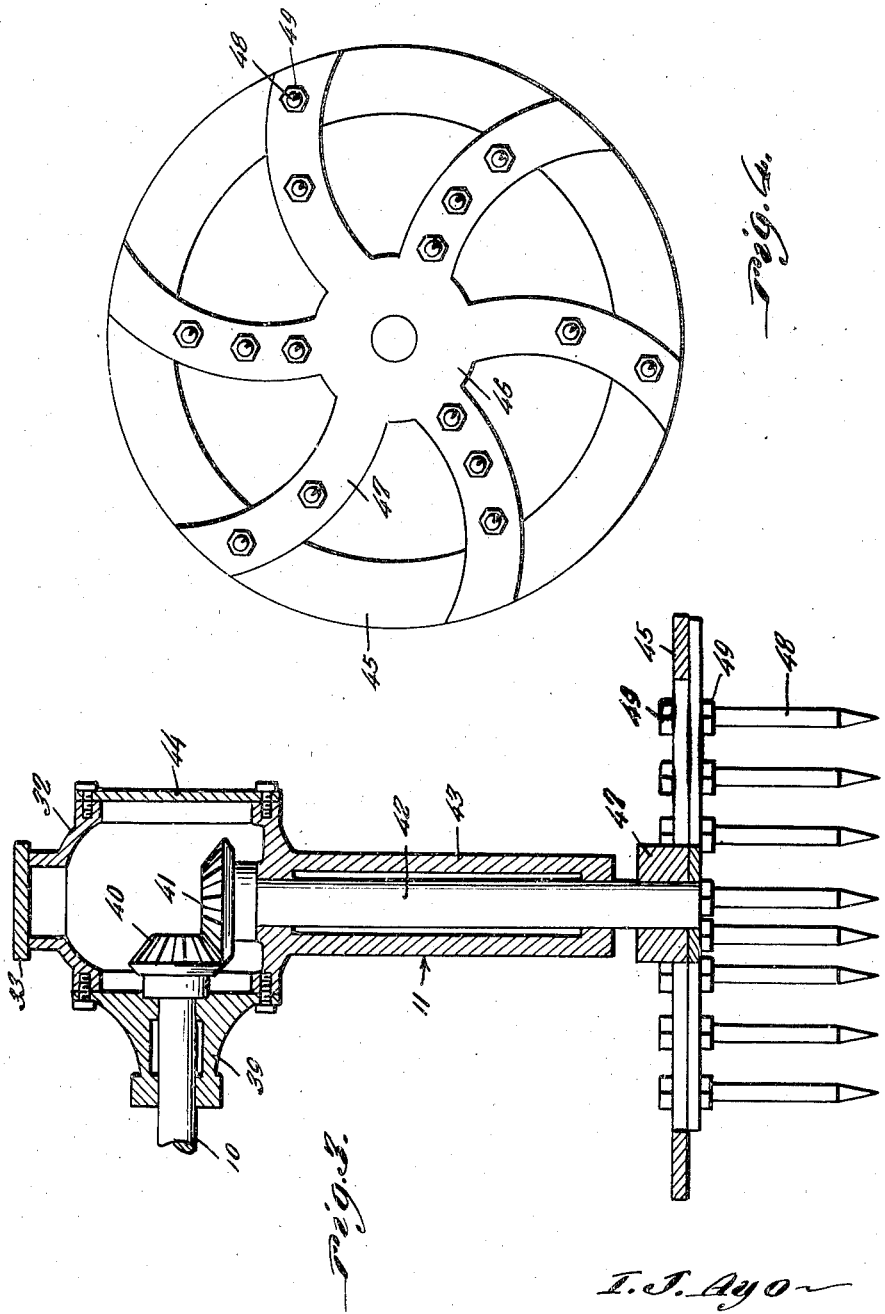

Patented Mar. 12, 1940

2,193,157

UNITED STATES PATENT OFFICE 2,193,157

AGRICULTURAL IMPLEMENT

Ishmeal Joseph Ayo, New Iberia, La., assignor of one-half to Eddie Joseph Ayo, New Iberia, La.

Application April 25, 1939, Serial No. 269,963

2 Claims. (Cl. 97—43)

This invention relates to new and useful improvements in agricultural implements and more particularly to a harrow.

The principal object of the present invention is to provide an agricultural implement in the nature of a harrow which is adapted to rotate in the soil in such a way as to break up clods and efficiently remove grass and other weeds.

Another important object of the invention is to provide a harrow of the character stated which can be elevated or lowered for the proper earth penetration.

These and other objects and advantages of the invention will become apparent to the reader of the following specification.

In the drawings:

Figure 1 represents a side elevational view of the implement attached to a tractor.

Figure 2 is a top plan view of the implement attached to a tractor.

Figure 3 is a sectional view taken substantially on line 3—3 of Figure 2.

Figure 4 is a top plan view of the rotor.

Referring to the drawings wherein like numerals designate like parts, it can be seen that in Figures 1 and 2 numeral 5 generally refers to the conventional tractor which has the driven shaft housing 6 merging with the rear axle housing 7 in which is the rear axle 8.

The numeral 9 denotes a power take-off stub shaft from the rear axle 8 or its differential, as the case may be, and this shaft 9 is connected to the stub shaft 10 of the implement generally referred to by numeral 11 through the agency of the slip coupling generally referred to by numeral 12, the same consisting of the tube 13 having the member 14 slidably but not rotatably disposed therein, with one end of the tube 13 connected by the universal joint 15 to the stub shaft 10 while the outer end of the slidable member 14 is connected by the universal joint 16 to the stub shaft 9.

Ears 17 on the housing 7 have rearwardly inclined arms 18—18 extending therefrom, the upper rear ends of these arms 18 supporting the shaft 19 which has the depending lever 20, forwardly from which extends the control rod 21.

Extending rearwardly from the shaft 19 are the arms 22—22, each of which has at its rear end a laterally offset rearwardly extending finger 23 defining a fork and disposed vertically through each of these forks is the eye-bolt 24. In each of these yokes is a swingably mounted apertured slot through which the corresponding eye-bolt 24 is disposed. The upper end portion of each of these eye-bolts 24 is threaded as at 25 and has a washer 26 and nut 27 engaged thereon. A coiled compressible spring 28 is interposed between the aforementioned swingable block and the corresponding washer 26.

Depending and pivotally secured to the eye end of each of the eye-bolts 24, as at 29, is a link eye 30 which in turn is pivotally secured at its lower end as at 31 to the gear case 32 of the implement 11.

A cross plate 33 is secured to the top of the case 32 and from the end portions of this plate 33, brace members 34 and 35 extend downwardly to connect to the angle members 36 and 37 respectively which are secured to the rearwardly disposed angle members 38, the latter being pivotally secured as at 39 to the pivotal arms 40 which extend rearwardly from the ears 41.

The gear case 32 has a bearing structure 39 through which the stub shaft 10 extends. The inner end of the stub shaft 10 has the bevel gear 40 which meshes with the bevel gear 41 at the upper end of the vertical shaft 42, the latter extending vertically through the barrel 43 which depends from the case 32. The case 32 has the removable plate 44 which permits access to the interior of the gear case.

The rotor of the implement 11 consists of the annulus 45, the hub plate 46 and the hub block 47. The hub 46 has a plurality of radially and arcuately disposed and shaped spokes 47 which are suitably secured as by welding, or otherwise at their outer ends to the underside of the annulus 45. Spikes 48 depend from the arms 47 in staggered relation with respect to each other, the upper ends of these spikes being threaded to accommodate the nuts 49 which clamp against opposite sides of the arms 47 and in some instances the annulus 45.

It can be seen that when the power take-off is operated after the rod 21 has been adjusted to lower the implement to the ground, the drive will be through the stub shaft 9, connection 12 and stub shaft 10, by way of the gears 40 and 41 and shaft 42 to the rotor shown in Figure 4.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. The combination with a tractor having a rear axle housing, and a power takeoff shaft extending rearwardly from the axle housing, of a circular harrow head, and means to mount said head on the rear of said tractor for rotation about a vertical axis and for vertical adjustment toward and from the ground comprising a pair of upper and lower spaced-apart frames extending rearwardly from said tractor and vertically swingable in unison, a vertically disposed sleeve fixed in the lower frame, a gear casing surmounting said sleeve and fixed thereto, an axial shaft upstanding from said head and journaled in said sleeve for rotation by said gears, operating connections between said power takeoff and gearing including a shaft and universal joints between said shaft and said takeoff and gears, manually operative means for swinging the upper frame, and yielding connections between said upper frame and said gear casing.

2. The combination with a tractor having a rear axle housing, and a power takeoff shaft extending rearwardly from the axle housing, of a circular harrow head, and means to mount said head on the rear of said tractor for rotation about a vertical axis and for vertical adjustment toward and from the ground comprising a pair of upper and lower spaced-apart frames extending rearwardly from said tractor and vertically swingable in unison, a vertically disposed sleeve fixed in the lower frame, a gear casing surmounting said sleeve and fixed thereto, an axial shaft upstanding from said head and journaled in said sleeve for rotation by said gears, operating connections between said power takeoff and gearing including a shaft and universal joints between said shaft and said takeoff and gears, manually operative means for swinging the upper frame, and yielding connections between said upper frame and said gear casing, said connections comprising a cross bar on said upper frame, a pair of bolts vertically slidable in said bar and tensioned against downward movement, and a pair of links swingably suspended from said bolts and pivoted to opposite sides of said gear casing respectively.

ISHMEAL J. AYO.